(12) United States Patent
Jahani et al.

(10) Patent No.: US 9,190,881 B1
(45) Date of Patent: Nov. 17, 2015

(54) ROTARY-POWERED MECHANICAL OSCILLATOR

(75) Inventors: Hooshang Jahani, Fremont, CA (US); Pegah M. Jamshidi, Fremont, CA (US)

(73) Assignee: Tooltek Engineering Corporation, Fremont, CA (US)

( * ) Notice: Subject to any disclaimer, the term of this patent is extended or adjusted under 35 U.S.C. 154(b) by 572 days.

(21) Appl. No.: 13/559,541

(22) Filed: Jul. 26, 2012

Related U.S. Application Data (60) Provisional application No. 61/514,033, filed on Aug. 2, 2011.

(51) Int. Cl.
*H02K 7/06* (2006.01)
*H02K 7/065* (2006.01)

(52) U.S. Cl.
CPC . *H02K 7/06* (2013.01); *H02K 7/065* (2013.01)

(58) Field of Classification Search
CPC ....... H02K 7/06; H02K 7/065; H02K 48/106; H02K 49/108
USPC ............................................. 310/80, 103, 50
See application file for complete search history.

(56) References Cited

U.S. PATENT DOCUMENTS

| | | | |
|---|---|---|---|
| 1,832,519 A | 11/1931 | Wheat et al. |
| 2,781,461 A | 2/1957 | Booth et al. |
| 2,977,614 A | 4/1961 | Frederick |
| 3,194,992 A | 7/1965 | Brown |
| 3,342,076 A | 9/1967 | Bodine |
| 3,624,667 A | 11/1971 | Muhler |
| 4,641,050 A | 2/1987 | Emerson et al. |
| 4,977,342 A | 12/1990 | Adams |
| 5,138,733 A | 8/1992 | Bock |
| 5,189,751 A | 3/1993 | Giuliani et al. |
| 5,263,218 A | 11/1993 | Giuliani et al. |
| 5,435,033 A | 7/1995 | Millner |
| 5,581,837 A | 12/1996 | Uchiyama et al. |
| 5,675,856 A | 10/1997 | Itzkowitz |
| 5,693,148 A | 12/1997 | Simmons et al. |
| 5,870,793 A | 2/1999 | Choffat et al. |
| 5,875,507 A | 3/1999 | Stephens et al. |
| 5,906,687 A | 5/1999 | Masui et al. |
| 5,934,908 A | 8/1999 | Woog et al. |
| 5,975,094 A | 11/1999 | Shurtliff |
| 6,002,195 A | 12/1999 | Puskas |
| 6,055,694 A | 5/2000 | Steere |
| 6,059,888 A | 5/2000 | Hillman |
| RE36,767 E | 7/2000 | Itzkowitz |
| 6,237,178 B1 | 5/2001 | Krammer et al. |
| 6,299,698 B1 | 10/2001 | Emami et al. |
| 6,330,728 B2 | 12/2001 | Ueki et al. |

(Continued)

OTHER PUBLICATIONS

Amden Corporation, Cybersonic Classic manual, 2008, Amden Corporation, Mission Viejo, CA, 9 pages.

*Primary Examiner* — Joshua Benitez-Rosario
*Assistant Examiner* — Leda Pham
(74) *Attorney, Agent, or Firm* — Charles Shemwell (57) ABSTRACT

Counterpart discs with respective sets of permanent magnets disposed at their periphery are rotated through an alternating sequence of repulsive and attractive positions to yield a repeating cycle of attractive and repulsive forces. At least one of the discs is freed to travel along the axis of relative rotation in response to the cyclical attractive/repulsive forces, thereby producing mechanical oscillation at a frequency determined by the number of magnetic positions in the two discs and the relative rotational speed of the discs.

22 Claims, 5 Drawing Sheets

(56) References Cited

U.S. PATENT DOCUMENTS

| | | | |
|---|---|---|---|
| 6,464,796 B2 | 10/2002 | Vail et al. | |
| 6,527,870 B2 | 3/2003 | Gotkis | |
| 6,588,043 B1 | 7/2003 | Frost et al. | |
| 6,618,889 B1 | 9/2003 | Terui et al. | |
| 6,622,334 B1 | 9/2003 | Ziemins et al. | |
| 6,648,979 B2 | 11/2003 | Lofaro et al. | |
| 6,676,765 B2 | 1/2004 | Mertens et al. | |
| 6,760,945 B2 | 7/2004 | Ferber et al. | |
| 6,810,548 B2 | 11/2004 | Yoshioka et al. | |
| 6,851,151 B1 | 2/2005 | Pena | |
| 6,851,152 B2 | 2/2005 | Sotozaki et al. | |
| 6,875,091 B2 | 4/2005 | Radman et al. | |
| 6,918,153 B2 | 7/2005 | Gruber | |
| 6,918,300 B2 | 7/2005 | Grez et al. | |
| 6,951,042 B1 | 10/2005 | Mikhaylichenko et al. | |
| 7,032,269 B2 | 4/2006 | Mikhaylichenko et al. | |
| 7,051,593 B2 | 5/2006 | Fletcher | |
| 7,063,749 B2 | 6/2006 | Sugarman | |
| 7,231,682 B1 | 6/2007 | Boyd et al. | |
| 7,383,601 B2 | 6/2008 | Ravkin et al. | |
| 7,409,741 B2 | 8/2008 | Dworzan | |
| 7,428,766 B2 | 9/2008 | Eliav et al. | |
| 7,516,507 B1 | 4/2009 | Oxsen et al. | |
| 7,625,452 B2 | 12/2009 | De Larios et al. | |
| 7,732,952 B1 | 6/2010 | Taylor | |
| 7,743,449 B2 | 6/2010 | Mikhaylichenko et al. | |
| 7,748,069 B2 | 7/2010 | Dawley | |
| 7,876,003 B2 | 1/2011 | Bax | |
| 7,913,346 B2 | 3/2011 | Iwami et al. | |
| 7,916,282 B2 | 3/2011 | Duineveld et al. | |
| 7,979,938 B2 | 7/2011 | Lilley et al. | |
| 8,487,484 B1 * | 7/2013 | Miller et al. | 310/12.14 |
| 2001/0002593 A1 | 6/2001 | Fishkin et al. | |
| 2002/0092104 A1 | 7/2002 | Ferber et al. | |
| 2005/0132513 A1 | 6/2005 | Eliav et al. | |
| 2006/0191086 A1 | 8/2006 | Mourad et al. | |
| 2007/0284956 A1 * | 12/2007 | Petrovich et al. | 310/80 |
| 2008/0122306 A1 * | 5/2008 | Kiramidzhyan | 310/80 |
| 2009/0070948 A1 * | 3/2009 | Bax | 15/22.2 |
| 2009/0211042 A1 | 8/2009 | Bock | |

* cited by examiner

ROTARY-POWERED MECHANICAL OSCILLATOR

CROSS-REFERENCE TO RELATED APPLICATIONS

This application hereby claims priority to and incorporates by reference U.S. Provisional Application No. 61/514,033, filed Aug. 2, 2011 and entitled "Sonic Brush."

TECHNICAL FIELD

The present disclosure relates to apparatus for achieving controlled mechanical oscillation as may be used, for example, to brush or otherwise prepare or condition surfaces in a manufacturing environment.

BACKGROUND

A work piece in a manufacturing process typically undergoes multiple process steps, each of which may yield contaminants (e.g., particulate, residue, absorbed components, etc.) that adhere to the surface of the work piece. Such contaminants are generally removed by scrubbing the work piece with a brush and/or submerging the work piece in an ultrasonic or megasonic bath.

Scrubbing is typically effected by a rotary brushing mechanism that rotates a brush head at speeds ranging from roughly 50-500 revolutions per minute (RPM). In general, the brush rotation speed and scrub time is dependent on the work piece and/or contaminant to be dislodged, with fine contaminants on smooth surfaces (e.g., as in sheet glass manufacturing, semiconductor wafer processing, thin-film processing, etc.) requiring relatively high brush stroke counts at various stages of manufacturing. Unfortunately even at maximum rotational speed, rotary brushing is often required for extended periods of time and/or multiple separate scrubbing cycles to achieve the requisite number of brush strokes. While higher brush stroke rates may be achieved through solenoid-actuated oscillators, such devices tend to consume impractically large amounts of power in industrial applications that require appreciably massive brushing members. Cam-based oscillating devices may also be used, but tend to wear quickly due to the friction contact between eccentric disc and follower, particularly in heavily loaded industrial applications.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which.

DETAILED DESCRIPTION

An apparatus that achieves sonic or ultrasonic mechanical oscillation by rotating counterpart magnetic assemblies through an alternating sequence of repulsive and attractive positions is disclosed in various embodiments. In a number of such "rotary-powered" oscillator embodiments, two counterpart discs are outfitted with respective sets of permanent magnets at their periphery. The magnets in each disc are configured in alternating North/South polar dispositions (e.g., alternating from North to South to North, etc.) so that, as the discs are rotated relative to one another, a repeating cycle of attractive and repulsive forces are generated. By freeing one of the discs, referred to herein as the "actuator" or "translator," to travel along the axis of relative rotation in response to the cyclical attractive/repulsive forces, mechanical oscillation is produced at a frequency determined by the number of magnetic positions in the two discs and the relative rotational speed of the discs. In one embodiment, the actuator disc is held in a constant angular position (i.e., does not rotate relative to a frame of the rotary-powered oscillator and/or a work piece) while the counterpart disc, referred to herein as a "rotor" is rotated to create the oscillatory force profile and thus oscillation of the actuator. By this operation, a highly efficient energy transfer is effected between a motor that delivers torque to turn the rotor and oscillation of the actuator. More specifically, the rotor may be operated, in effect, as a flywheel with a moment of inertia that resists changes in rotational speed as the rotor and actuator cycle between attractive and repulsive positions. Thus, in contrast to solenoid-based oscillators that expend energy to rapidly change the direction of a solenoid armature (thus significantly limiting the armature mass and thus the amount of oscillating force generated), the rotor motor in a rotary-powered oscillator need only supply enough torque to overcome frictional loss (including magnetic friction) and thus constitutes a highly-efficient source of sonic or ultrasonic mechanical oscillation that may be scaled to meet a broad variety of applications. These and other features and advantages are described below primarily in connection with industrial brushing applications that tend to require oscillation of substantially massive brush members. In all such cases, the mechanical oscillator embodiments disclosed may be applied to propel other mechanical loads including, for example and without limitation, personal hygienic brushing or exfoliating implements, medical devices, modal shaking devices (i.e., generalized vibration sources that may be used, for example, in industrial applications) and so forth.

Figure 1:
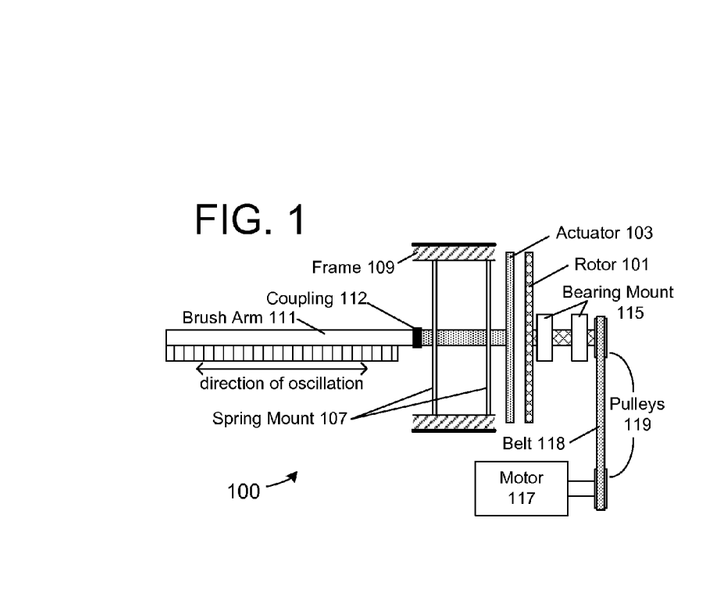
FIG. 1 illustrates an embodiment of a sonic brush having a rotor and actuator that are rotated relative to one another to effect a rotary-powered mechanical oscillator.

FIG. 1 illustrates an embodiment of a "sonic brush" 100 having a rotor 101 and actuator 103 that are rotated relative to one another to effect a rotary-powered mechanical oscillator. In the implementation shown, rotor 101 is rotatably mounted to a frame 109 (or chassis or housing) of the sonic brush via bearing mounts 115, while actuator 103 is held in a fixed angular position with respect to frame 109 via spring-mount elements 107. Torque is applied to a shaft of rotor 101 to turn the rotor relative to the actuator which, by virtue of magnetic structures disposed within the periphery of the rotor and translator, yields a magnetic force profile that cycles (oscillates) as the rotor and translator transition between attractive and repulsive alignments. In the example shown, a motor 117 delivers torque to the rotor via a belt 118 and pulley arrangement 119, thus avoiding axial alignment of the motor and rotor so that parasitic vibration in the rotor does not transfer directly to the motor (i.e., the belt/pulley arrangement allows some lateral displacement between the motor and rotor). Alternative mechanisms for delivering torque to the rotor, including axially-coupled arrangements (i.e., rotor shaft is coupled directly or via spring or other vibration-absorbing coupling to motor shaft, or rotor and motor assemblies share a common drive shaft), direct-drive arrangements (e.g., rotor disc itself serves as pulley to receive belt and/or a gear to mesh with a counterpart gear of a drive mechanism) and so forth, may be applied in alternative embodiments.

Figure 2:
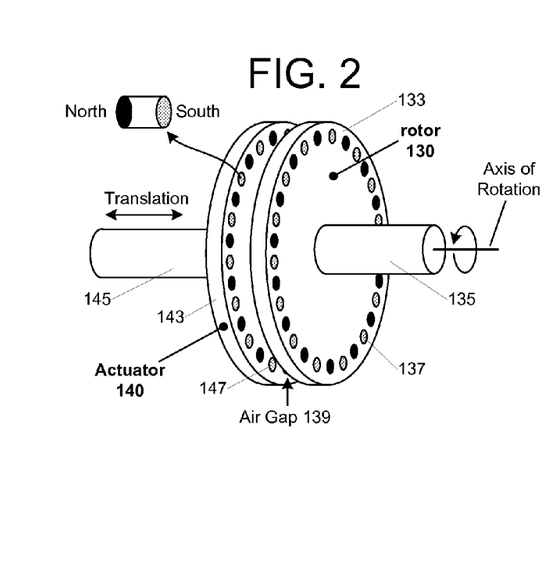
FIG. 2 illustrates exemplary rotor and actuator assemblies that may be used to implement the rotor and actuator of FIG. 1.
Figure 3:
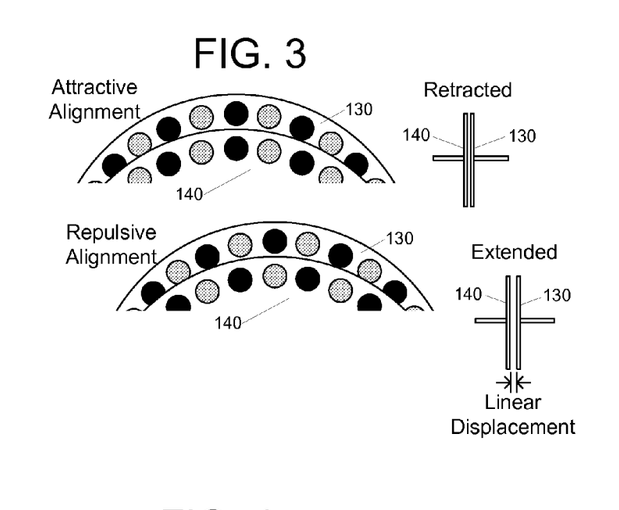
FIG. 3 illustrates transitioning of the permanent magnets in the rotor and actuator of FIG. 2 between attractive and repulsive alignments.
Figure 4:
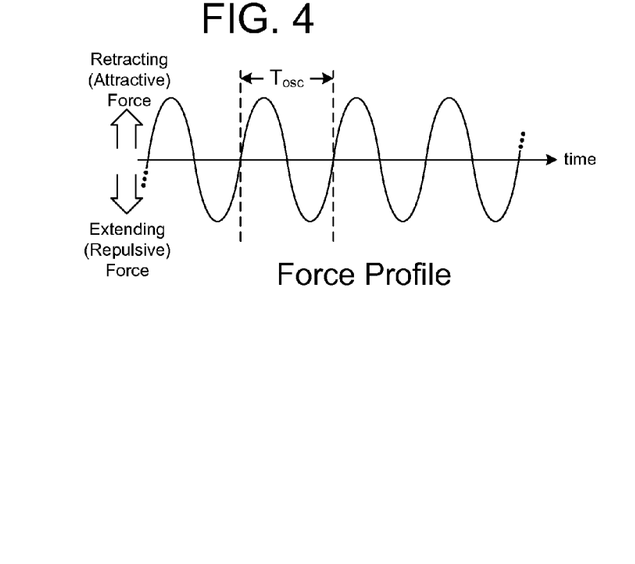
FIG. 4 illustrates an exemplary sinusoidal force profile.

FIG. 2 illustrates exemplary rotor and actuator assemblies (130, 140) that may be used to implement rotor 101 and actuator 103 of FIG. 1. In the implementation shown, rotor 130 includes a disc 133 and drive shaft 135, with a set of permanent magnets 137 disposed in a circular pattern along the periphery of the disc in alternating North-pole and South-pole orientations with respect to an air gap 139 between the rotor and actuator and in which each of the permanent magnets has a maximum lineal dimension parallel to the surface of disc 133 that is substantially smaller than a radius of the circular pattern. Actuator 140 similarly includes a disc 143 and shaft 145, with a set of permanent magnets 147 disposed along the periphery of the disc in alternating North/South orientations with respect to air gap 139. By this arrangement, as the rotor and actuator are rotated relative to one another (e.g., rotated in countervailing directions, or one rotated while the other is held stationary with respect to a given frame of reference), the permanent magnets in the two discs 133, 143 transition alternately between attractive and repulsive alignments, as shown, for example in FIG. 3. That is, in an attractive alignment, the North-oriented and South-oriented magnets within the rotor are positioned directly across the air gap from South-oriented and North-oriented magnets within the actuator, respectively (i.e., such that a line normal to the surfaces of the rotor and actuator discs may be extended across the air gap between the center-points of each counterpart pair of magnets), thus establishing a maximum attractive force between the rotor and actuator. As the discs rotate from the attractive alignment to the repulsive alignment, the opposite condition results, with the North-oriented and South-oriented magnets of the rotor falling directly across the air gap from the North-oriented and South-oriented magnets of the actuator, respectively, thus effecting a maximum repulsive force between the rotor and actuator. If air gap 139 was held constant, the resulting force profile would be substantially sinusoidal as shown in FIG. 4, cycling from peak attractive force to peak repulsive force and back for each transition from attractive alignment to repulsive alignment and back to attractive alignment and thus cycling N/2 times over a complete revolution of the rotor with respect to the actuator, where N is equal to the number of alternating-pole magnet sites disposed in the periphery of the rotor and actuator discs. In one embodiment, for example, rotor 130 and actuator 140 are outfitted with 30 permanent magnet sites (each of which may include a single permanent magnet or a gang of two or more like-oriented permanent magnets) around their peripheries, so that fifteen cycles of attractive/repulsive force (i.e. corresponding to the 15 magnetic cycles) are generated in each revolution of the rotor relative to the actuator. The oscillation period, $T_{OSC}$ (i.e., inverse of oscillation frequency), is the product of the number of magnetic cycles per revolution (N/2) and the rotational speed of the rotor relative to the actuator ($\omega$—revolutions per second) and thus $\omega N/2$. Accordingly, the oscillation frequency of the magnetic force and therefore the mechanical oscillation frequency of actuator 140 may be readily controlled by changing the speed of the relative rotation. Moreover, continuing the example of 30 permanent magnet sites (i.e., 15 magnetic cycles per revolution), a relatively wide range of mechanical oscillation may be achieved with a relatively simple drive mechanism. For example, assuming that a variable-speed drive mechanism is capable of producing a relatively steady rotor rotation at any speed from 60 to 3000 revolutions per minute (RPM), mechanical oscillation of the actuator ranging from 15 Hertz to 750 Hertz results. Of course, broader or narrower rotational speed ranges and greater or smaller numbers of permanent magnet sites may be provided to yield different minimum/maximum oscillation frequencies and/or broader oscillation frequency ranges.

Figure 5:
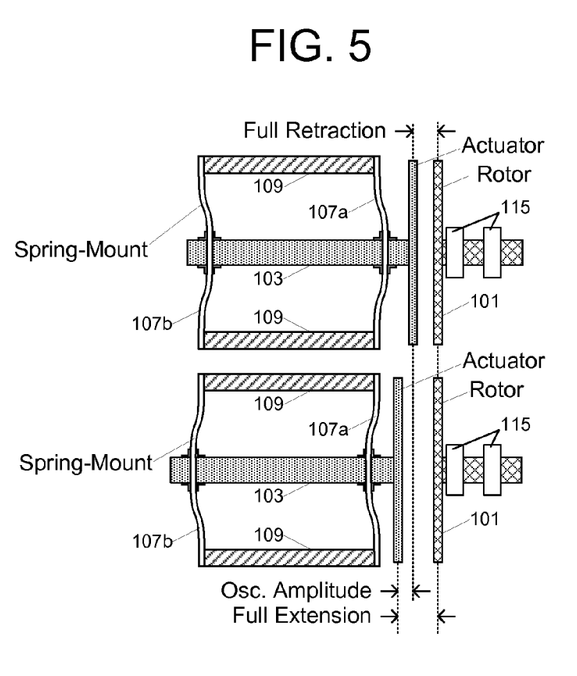
FIG. 5 illustrates flexing of the actuator spring mounts in response to alternating forces of magnetic attraction and repulsion that result as the rotor and actuator are rotated relative to one another.

Referring again to the exemplary sonic brush 100 of FIG. 1, the spring mounts 107 that secure actuator 103 to frame 109 are designed to flex in a direction parallel to the axis of rotor rotation (i.e., the axis of rotation shown in FIG. 2) in response to the alternating repulsive/attractive forces. Referring to FIGS. 3 and 5, for example, when the rotor and actuator are in an attractive alignment (yielding the peak attractive force shown in the force profile FIG. 4), the spring mounts (107a and 107b in FIG. 5) flex as the actuator is pulled toward to the rotor (i.e., retracted), thus establishing the fully retracted disposition of actuator 103 relative to rotor 101 and corresponding minimum distance between the actuator and rotor as shown in FIG. 5. By contrast, when the rotor and actuator are in a repulsive alignment (yielding the peak repulsive force shown in the force profile of FIG. 4), the spring mounts 107a/107b flex in the opposite direction as actuator 103 is pushed away from rotor 101, thus establishing the fully extended disposition of the actuator relative to the rotor and corresponding maximum distance therebetween as shown in FIG. 5. The amplitude of the resulting mechanical oscillation (i.e., in which the distance between the rotor and actuator increases beyond an average distance during a repulsive portion of each translation cycle and decreases below the average distance during an attractive portion of each translation cycle) or actuator "stroke length" is the difference between these maximum and minimum distances between actuator 103 and rotor 101. In the embodiment of FIG. 1, for example, a brush arm 111 bearing a brush bristle or other surface preparation element is fastened to the actuator shaft via coupling 112 so that the oscillation amplitude corresponds to the length of the brush stroke effected on a given surface.

Figure 6A:
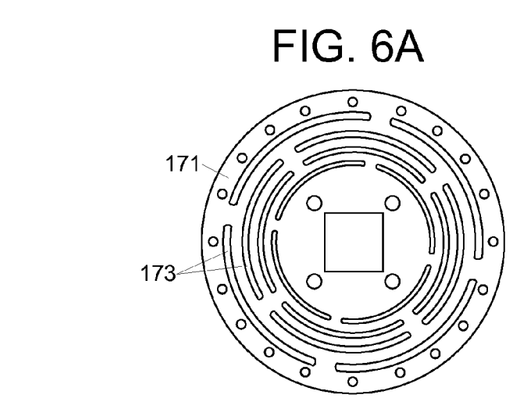
FIGS. 6A and 6B illustrate embodiments of spring mounts that may be used to implement the spring mounts shown in FIGS. 1 and 5.
Figure 6B:
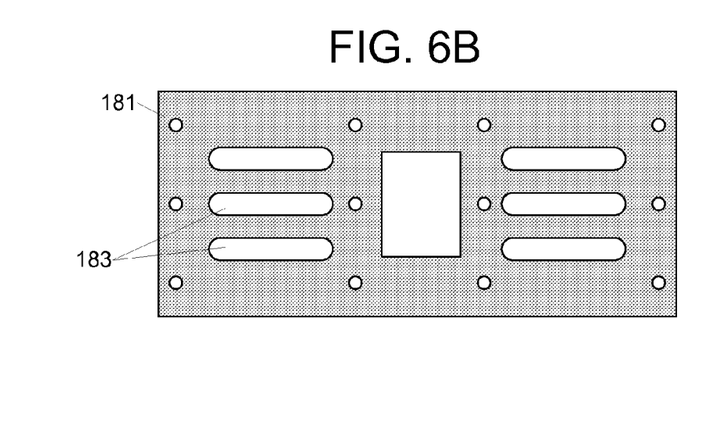

FIGS. 6A and 6B illustrate embodiments of spring mounts 171 and 181, respectively, that may be used to implement the spring mounts shown in FIGS. 1 and 5. In the embodiment of FIG. 6A, spring mount 171 is formed by a relatively thin disc of flexible, memoryless material having cutaways 173 in arrangement, size and quantity to yield a desired flex (i.e., deformation and thus range of motion) as the actuator is repelled and attracted by the rotor. In the embodiment of FIG. 6B, spring mount 181 is formed by a rectangular sheet of flexible, memoryless material, again having cutaways 183 in arrangement, size and quantity to yield a desired range of motion. In general, any material may be used to implement the spring mounts of FIGS. 6A and 6B including, but not limited to phenolic, fiberglass, hardened-steel leaf spring, etcetera in any practicable thicknesses and/or numbers of laminate layers, discrete sheets and so forth. Also, regardless of form factor or material, the spring mount may be secured directly to the frame and/or actuator shaft, or may be clamped thereto by a collar or other clamping mechanism. In either case, washers, gaskets or other load-distributing elements may be provided on either side of the spring mount.

Figure 7:
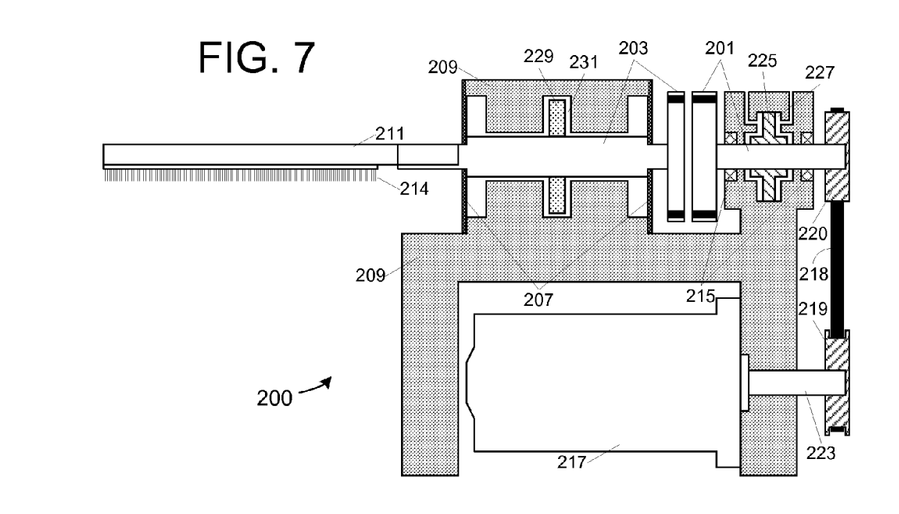
FIG. 7 illustrates a cross-section of an embodiment of a rotary-oscillator-powered sonic brush showing greater detail with respect to a travel-limit arrangement and adjustable air gap between the actuator and rotor.

FIG. 7 illustrates a cross-section of another embodiment of a rotary-oscillator-powered sonic brush 200 showing greater detail with respect to a travel-limit arrangement and adjustable air gap between actuator 203 and rotor 201. In the implementation shown, a rotor motor 217 and piston-based rotor-displacement assembly are mounted to or within a common frame 209 which, though shaded as a monolithic structure, may be formed by fastening a number of discrete members to one another. As in embodiments described above, rotor motor 217 applies torque to a shaft of rotor 201 through a belt 218 and pulley system (i.e., including motor pulley 219 and rotor pulley 220), and the rotor disc includes permanent magnets disposed at its periphery to produce cyclical attractive/repulsive forces with respect to counterpart magnets in the periphery of the actuator disc. The actuator shaft, which is formed integrally with or secured to the actuator disc to form actuator 203, is mounted to frame 209 by spring mount members 207 as generally described above and is secured to a brush arm 211 or other member bearing a surface-preparation structure 214 or, more generally, any other member to be oscillated.

In the implementation shown, a travel-limiting member 229 is secured to a circumference of the actuator shaft (though the cross-section of the actuator shaft may be rectangular or otherwise polygonal, U-shaped or any other useful shape) and thus oscillates within a chamber 231 formed within the frame, contacting one or both walls of the chamber when the actuator oscillation reaches an amplitude limit (i.e., travel limit). In one implementation, for example, the travel-limiting member is formed from a compressible but memoryless material (e.g. rubber or plastic) that provides a countervailing spring force when the oscillation amplitude reaches a limit, thus limiting the overall travel of the actuator to a point that prevents destructive contact between the actuator and rotor and/or brush stroke lengths greater than a specified limit. While a single actuator-mounted travel-limit member (229) is shown, two or more of such members may be mounted at various points along the length of the actuator shaft and/or travel limiting members may be mounted to the frame to make contact (i.e., upon over-limit oscillation) with surfaces projecting from the actuator shaft.

Still referring to FIG. 7, the rotor shaft is slidably and rotatably mounted to frame 209 via bearing mounts 215 and is additionally secured to a pneumatically actuated piston 225 that may be used to move the entire rotor assembly (i.e., rotor disc and shaft 201, piston 225 and pulley 220) nearer to or further away from actuator 203. By this arrangement, the mean air gap between rotor 201 and actuator 203 may be increased or decreased to effect a corresponding decrease or increase in oscillation force (i.e., as the magnetic attractive/repulsive force is inversely proportional to the square of the distance between the permanent magnets of the rotor and actuator).

Figure 8A:
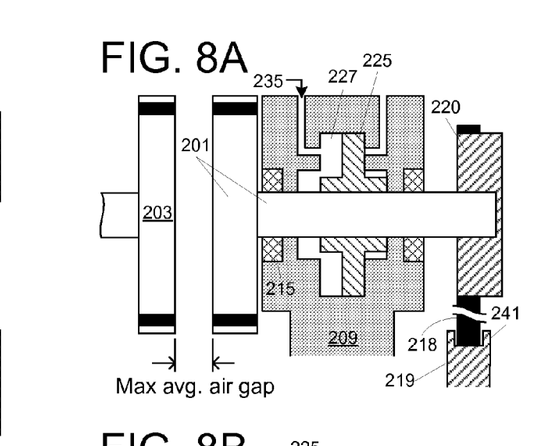
FIGS. 8A and 8B illustrate the two air gap dispositions enabled by the pneumatic air-gap adjustment structure shown in FIG. 7.
Figure 8B:
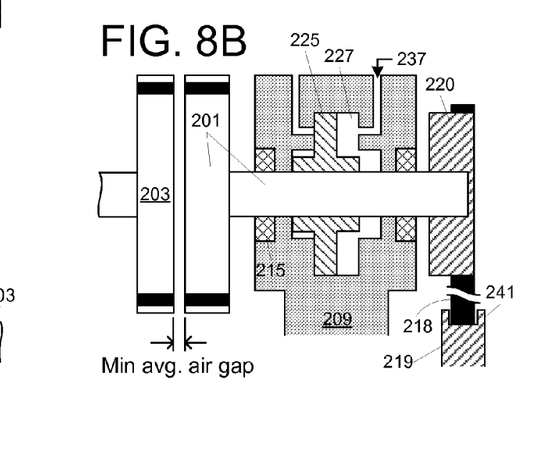

FIGS. 8A and 8B illustrate the two air gap dispositions enabled by the pneumatic air-gap adjustment structure shown in FIG. 7. Referring first to FIG. 8A, when pneumatic pressure is applied to the piston chamber via duct 235, the piston and thus the entire rotor assembly slides or moves (i.e., is translated or displaced) in a direction away from the actuator to achieve a maximum average air gap. In one embodiment, the pulley-drive belt 218 is maintained in position relative to frame 209 by virtue of flanges 241 on the motor pulley 219 and thus migrates toward a "retracted" side of rotor pulley 220. By contrast, when pneumatic pressure is applied to the piston chamber via duct 237 as shown in FIG. 8B, the rotor assembly is forced (i.e., is slidably driven or moved) toward the actuator to achieve a minimum average air gap, with pulley belt 218 migrating toward the opposite, "extended" side of rotor pulley 220.

Referring again to FIG. 7, it should be noted that numerous other air-gap adjustment arrangements (or rotor displacement mechanisms) may be provided, including pneumatically driven structures that may be moved to multiple positions along a range of travel, as well as electromechanically actuated structures (e.g., lead-screw arrangements) that enable precise control over the mean air gap between rotor 201 and actuator 203. Also, as discussed below, feedback regarding the magnitude of the air gap and/or the amplitude of the actuator oscillation (which may serve as an indication of the amplitude of the oscillating magnetic force and thus an indirect measure of the air gap) may be received by a controller and used to servo the rotor to a desired displacement relative to the actuator (i.e., through iterative adjustment of the air gap).

Figure 11:
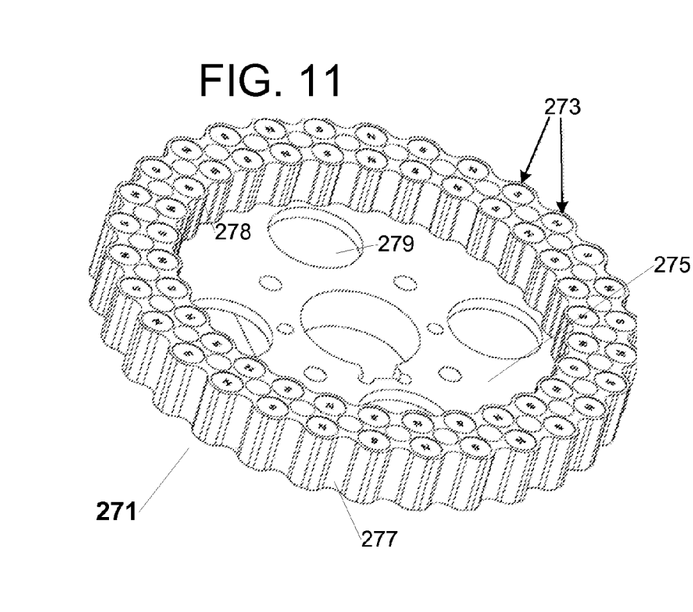
FIGS. 11 and 12 illustrate embodiments of counterpart actuator and rotor discs, respectively, that may be used to implement actuators and rotors in the embodiments described in reference to FIGS. 1-8B.
Figure 12:
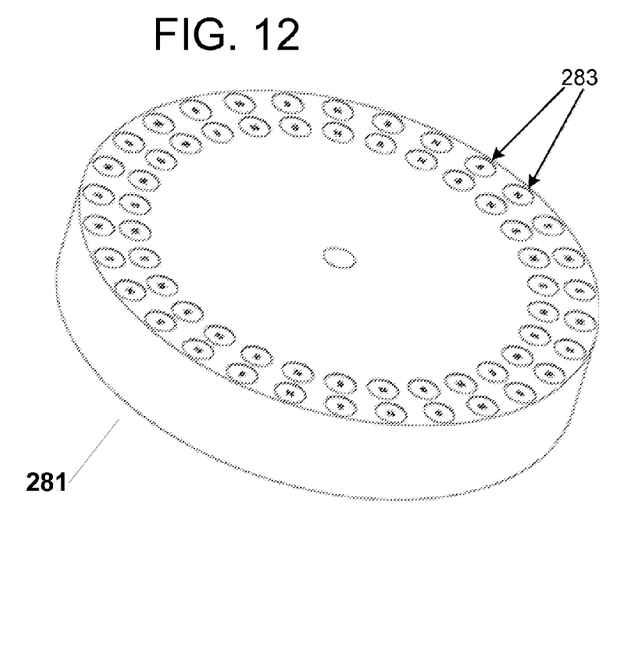

FIGS. 11 and 12 illustrate embodiments of counterpart actuator and rotor discs, respectively, that may be used to implement actuators and rotors in the embodiments described above. In the embodiment shown in FIG. 11, actuator disc 271 is machined, molded or otherwise formed so as to achieve a desired mechanical strength (i.e., tensile, compressive and/or shear strength) with relatively low mass, thereby reducing its moment of inertia and thus increasing oscillation amplitude with respect to a given oscillating force. As an example, a center cavity 275 may be hollowed out (with voids or holes 279 formed therein), and exterior and interior diameters of the magnet-holding perimeter (i.e., containing permanent magnets 273) are contoured as shown at 277 and 278 so as to remove as much unneeded mass from the actuator disc as possible without compromising mechanical strength.

In contrast to the low-mass construction of the actuator disc, rotor disc 281 is, at least in the embodiment shown in FIG. 12, designed to have a relatively high-mass, thereby increasing its efficacy as a fly wheel (i.e., capable of storing appreciable inertial energy at practical rotational speeds) and thus reducing ripple in the rotor speed as the rotor is subjected to alternating magnetic braking and accelerating forces. Permanent magnets 283 are disposed in the perimeter at locations corresponding to counterpart permanent magnets in the actuator. Although each of the actuator and rotor discs (271, 281) is shown as containing thirty magnet sites, with two permanent magnets per site, more or fewer permanent magnet sites may be provided in alternative embodiments, with more or fewer permanent magnets per site. Also, while the permanent magnets are depicted as having a cylindrical form factor, the permanent magnets may have virtually any shape that enables an alternating polar disposition (i.e., North to South to North) through the sequence of magnetic sites. For example, the magnetic elements may be polyhedrons of virtually shape (e.g., prismatoids including cuboids, prisms having trapezoidal cross section, etc.) as well as ellipsoids (including spheres) or elliptically cross-sectioned shapes.

Figure 9:
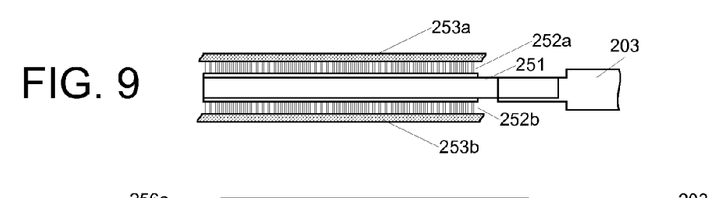
FIGS. 9 and 10 illustrate alternative embodiments of load-arms that may be coupled to the actuator of a rotary-powered oscillator.
Figure 10:
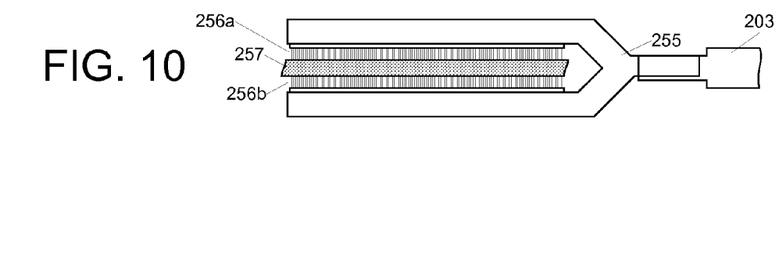

FIGS. 9 and 10 illustrate alternative embodiments of load-arms that may be coupled to actuator 203. In the embodiment of FIG. 9, load arm 251 oscillates two or more surface preparation media 252a and 252b as a unit to simultaneously condition surfaces of respective work pieces 253a and 253b (or to condition opposing surfaces or inner-diameter surfaces of a single work piece). A single surface preparation medium having a three-dimensional aspect (e.g., cylindrical or cuboidal such that the surface preparation media envelops load arm 251) may be used to condition interior regions of a work piece such as the interior surface of a pipe or other cylindrical work piece, or the interior of a cuboidal shaft or cavity.

In the embodiment of FIG. 10, load arm 255 is forked to form a jaw-like structure having respective surface preparation media 256a and 256b disposed opposite one another and in contact or proximity to opposing surfaces of a work piece 257. By this arrangement, the opposite surfaces of the work piece 257 may be conditioned simultaneously, thus reducing the time required to prepare the work piece for subsequent processing.

Though depicted as brushes in FIGS. 9 and 10, the surface preparation media (i.e., 252a, 252b, 256a, 256b) may be implemented by any other useful structures or materials including, without limitation, sponges of various types, fibrous structures, abrasives, buffers or polishing materials, and so forth, as well as combinations of different types of surface preparation media. The brush arm may additionally include one or more channels and/or nozzles for dispensing or spraying fluids useful for surface preparation including, without limitation, pressurized gas (e.g., air), solvents, abrasives, etchants, polishing solutions, etc.

While the rotor and actuator discs shown in FIGS. 11 and 12 may be constructed using virtually any material (including assemblies of different material types), the contrasting mass objectives motivate choices of strong but lightweight materials for the actuator and more massive materials for the rotor. Because the relative rotation of the two discs creates continual change in magnetic flux with respect to the rotor and actuator discs, substantial undesired eddy currents (i.e., consuming energy and generating heat) may result in conductive materials, thus motivating the choice of non-conductive materials to implement each disc. In one embodiment, for example, actuator disc 171 is formed by cast aluminum, while rotor disc 181 is formed by a glass epoxy laminate (i.e., fiberglass) such as G-10 or FR-4. In both cases, any other practicable material(s) may be used to implement the actuator disc and/or rotor disc, including materials (or assemblies of homogenous or non-homogenous materials) having different specific gravities, mechanical strengths, dielectric constants, and so forth.

Figure 13A:
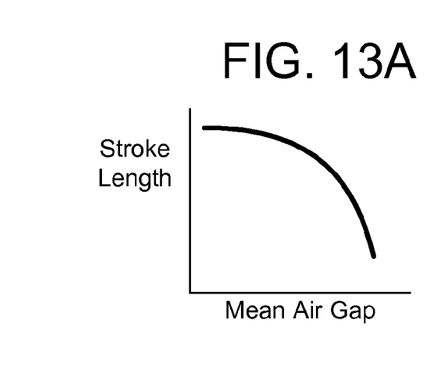
FIG. 13A illustrates an inverse relationship between stroke length and rotor-actuator air gap.
Figure 13B:
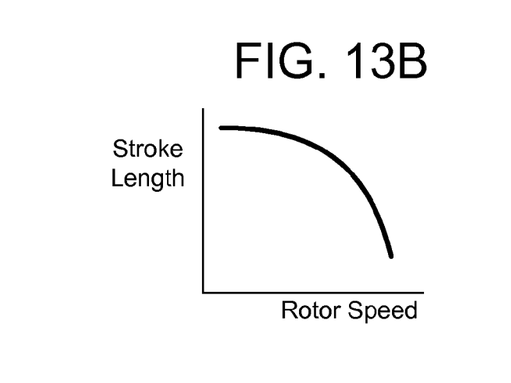
FIG. 13B illustrates an inverse relationship between stroke length and rotor speed.

FIG. 13A illustrates the inverse relationship between stroke length and rotor-actuator air gap and FIG. 13B illustrates a similar inverse relationship between stroke length and rotor speed. As FIG. 13A demonstrates, stroke length drops quickly in response to increase in air gap as the attractive/repulsive force between the rotor and actuator is inversely proportional to the square of the distance between them. Stroke length also drops precipitously as the angular speed of the rotor increases (shown as a roughly quadratic function of rotor speed, though various other profiles may result depending on load dynamics, friction and other factors) due to the shortening cycle period ($T_{OSC}$) and correspondingly shorter travel distance that results. That is, starting from a stopped position and ignoring the countervailing effect of the actuator spring mount, stroke length is quadratically proportional to the duration of an applied attractive or repulsive force (i.e., $at^2/2$, where a is the mean acceleration and thus a function of the applied force and mass of the actuator and brush arm or other load) and thus inversely proportional to the square of the rotor speed. From this analysis it can be seen that as the rotor reaches a maximum practical speed, the duration of applied force becomes insufficient to induce significant motion in the brush arm or other oscillated load.

Figure 14:
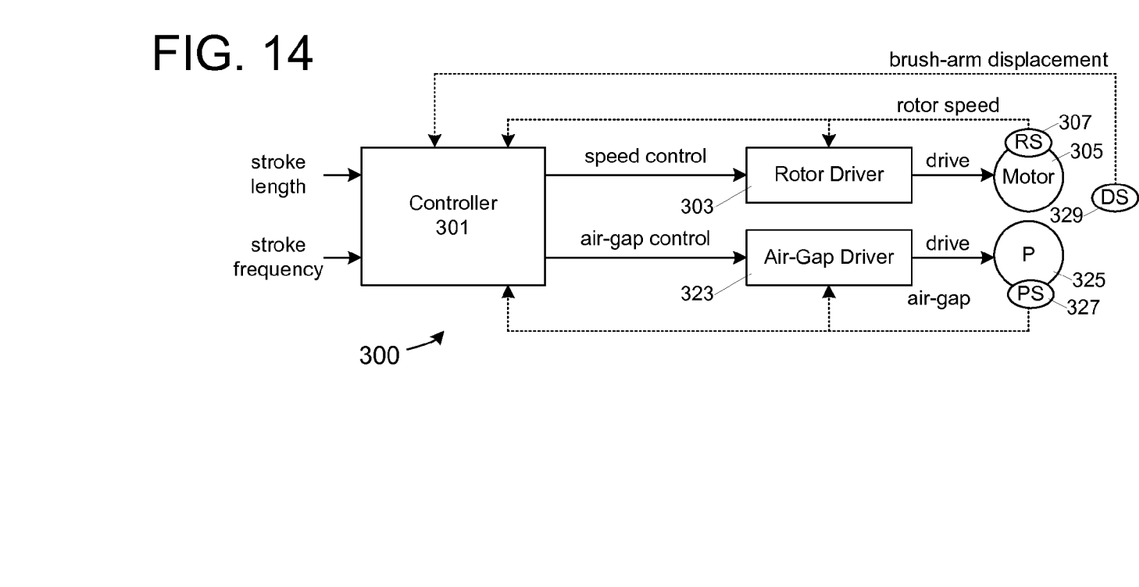
FIG. 14 illustrates an embodiment of a system controller for controlling rotor speed and/or air gap as necessary to achieve a desired stroke length and stroke frequency in view of the exemplary stroke length dependencies presented in FIGS. 13A and 13B.

FIG. 14 illustrates an embodiment of a system controller 301 that may be provided to control rotor speed and/or air gap as necessary to achieve a desired stroke length and stroke frequency in view of the exemplary stroke length dependencies presented in FIGS. 13A and 13B. As shown, controller 301 receives stroke length and stroke frequency inputs from an operator (e.g., via a user interface provided as part of the controller or via a control port that enables communication with a computer or other user-interactive control device) and applies that information, together with optional feedback, to generate speed control and air-gap control signals. The speed control signals are supplied to a rotor driver 303 that, in turn, outputs drive signals to a rotor motor 305. The rotor motor, which may be, for example, a stepper or microstepper motor, DC motor, brushless motor, or even a fluid-driven motor (e.g., a pneumatically powered motor), may optionally include or be coupled to a tachometer, rotary encoder or other device ("RS" 307) that provides a signal indicative of rotor speed to rotor driver 303 and/or controller 301.

The air-gap control signals are similarly supplied to an air-gap driver 323 that outputs drive signals to a piston, lead screw motor or other linear displacement mechanism ("P") capable of adjusting the air gap between the rotor and actuator. As shown, a feedback mechanism "PS" 327 (e.g., linear encoder or, in the case of a lead-screw motor, a rotary encoder) that indicates a displacement of the rotor assembly within a range of travel may optionally be provided in association with the air-gap adjustment mechanism to deliver positional feedback to air-gap driver 323 and/or controller 301. An additional or alternative feedback sensor "DS" 329, such as a linear encoder or accelerometer may optionally be coupled to the brush arm actuator (i.e., translator) to provide feedback to controller 301 regarding the brush arm displacement within a range of travel, and thus an indication of the stroke length and stroke frequency.

In an embodiment in which rotor speed is fed back to the rotor driver, the rotor driver may operate as a servo-controller that outputs drive signals to the motor in accordance with an error between target rotor speed (i.e., according to the speed control signals from the controller and thus the operator-specified stroke frequency) and actual rotor speed (i.e., the latter being indicated by feedback) as necessary to maintain the rotor speed within a predetermined range of the target rotor speed. Alternatively, the controller may receive the rotor speed feedback instead of the rotor driver and iteratively adjust the speed control signals as necessary to maintain the rotor speed within range of the target. Similarly, the air-gap driver or controller may receive the rotor displacement feedback and output drive signals or air-gap control signals, respectively, as necessary to maintain an air gap within a predetermined range. In one embodiment, for example, controller 301 determines a target or desired air gap between rotor and actuator based on the operator-specified stroke length and stroke frequency. More specifically, the controller outputs a speed control signal that corresponds to the specified stroke frequency, and determines (e.g., via calculation or a table lookup generated based on empirical and/or calculated stroke lengths at various stroke frequencies and air-gap settings) a target air-gap that will yield the operator-specified stroke length at the applied rotor speed, outputting a corresponding air-gap control signal to the air gap driver. In an embodiment having a sensor 329 to provide brush-arm displacement feedback, the controller may servo (i.e., dynamically adjust) the air-gap control signal as necessary to yield the operator-specified stroke length.

Reflecting on the controller embodiment of FIG. 14, it should be noted that significantly less complex control arrangements may be used. For example, in an embodiment in which precise stroke frequencies and/or stroke lengths are unneeded, a manual speed control (e.g., varactor, potentiometer and/or other drive speed mechanism) may be provided to control the rotor speed and thus the stroke frequency and stroke length. Air-gap control may be omitted entirely or limited to a relatively small number of displacement settings (e.g., two settings as in the pneumatic piston arrangement shown in FIGS. 7, 8A and 8B). Where resonant frequencies of the sonic brush apparatus and/or work piece are to be avoided, the rotor speed control may be electrically or mechanically limited to a predetermined number of speed settings that "step over" speeds corresponding to such resonant frequencies. Similarly, in the rotor control arrangement shown in FIG. 14 may bypass predetermined or programmed "forbidden" stroke frequencies to avoid driving the sonic brush and/or work piece into resonance. In yet other embodiments, vibrational feedback of the sonic brush apparatus and/or work piece may be provided to controller 301, enabling the controller to autonomously detect and avoid resonance conditions.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific values of oscillation frequencies, rotational speeds, stroke lengths and the like can be different from those described above in alternative embodiments. The term "coupled" is used herein to express a direct connection as well as a connection through one or more intervening circuits or structures. Device "programming" can include, for example and without limitation, loading a control value into a register or other storage circuit within the device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

Various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. An apparatus for generating mechanical oscillation, the apparatus comprising:
a frame;
a first disc rotatably mounted to the frame to enable rotation about an axis and having a surface that extends radially from the axis of rotation;
a plurality of permanent magnets disposed on or within the surface of the first disc in an alternating polar orientation and in a circular pattern concentric with the axis of rotation, each of the permanent magnets having a maximum lineal dimension parallel to the surface of the first disc that is substantially smaller than a radius of the circular pattern;
a second disc translatably mounted to the frame adjacent the first disc and having a radially-extending surface disposed parallel to and adjacent the surface of the first disc; and
a plurality of permanent magnets disposed on or within the surface of the second disc in an alternating polar orientation and in a circular pattern concentric with the axis of rotation of the first disc such that, as the first disc is rotated with respect to the second disc, the permanent magnets of the first and second discs move cyclically between attractive and repulsive positions with respect to one another to cause the second disc to translate cyclically toward and away from the first disc.

2. The apparatus of claim 1 further comprising a motor arrangement to rotate the first disc relative to the second disc at any one of a plurality of selectable rotation speeds.

3. The apparatus of claim 2 wherein the cyclical translation of the second disc with respect to the first disc constitutes a mechanical oscillation having a frequency and amplitude, the apparatus further comprising a controller to control at least the frequency of the mechanical oscillation by changing the rotation speed of the first disc relative to the second disc via the motor arrangement.

4. The apparatus of claim 1 wherein the first and second discs are axially aligned and offset by a distance that varies cyclically in correspondence with the translation of the second disc, increasing beyond an average distance during a first portion of each translation cycle and decreasing below the average distance during a second portion of each translation cycle, the apparatus further comprising a displacement mechanism to enable adjustment of the average distance by translating the first disc along the axis of rotation to a selected one of a plurality of different positions with respect to the frame.

5. The apparatus of claim 4 wherein, after translating the first disc to the selected one of the plurality of different positions with respect to the frame, the displacement mechanism maintains the first disc at the selected one of the plurality of different positions with respect to the frame while the second disc translates cyclically toward and away from the first disc.

6. The apparatus of claim 4 wherein the cyclical translation of the second disc with respect to the first disc constitutes a mechanical oscillation having a frequency and amplitude, and wherein changing a position of the first disc via the displacement mechanism from any one of the plurality of different positions to any other one of the plurality of different positions effects adjustment of the amplitude of the mechanical oscillation at a given frequency.

7. The apparatus of claim 4 wherein the cyclical translation of the second disc with respect to the first disc constitutes a mechanical oscillation having a frequency and amplitude, the apparatus further comprising a controller to control the amplitude of the mechanical oscillation at a given frequency by changing a position of the first disc via the displacement mechanism.

8. The apparatus of claim 1 further comprising a load arm coupled to the second disc, wherein the cyclical translation of the second disc mechanically oscillates the load arm.

9. The apparatus of claim 8 wherein the load arm comprises a surface preparation medium.

10. An apparatus for generating mechanical oscillation, the apparatus comprising:
   a frame;
   a first disc rotatably mounted to the frame and having permanent magnets disposed at its periphery in an alternating polar orientation;
   a second disc translatably mounted to the frame adjacent the first disc and having permanent magnets disposed at its periphery in an alternating polar orientation such that, as the first disc is rotated with respect to the second disc, the permanent magnets of the first and second discs move cyclically between attractive and repulsive positions with respect to one another to cause the second disc to translate cyclically toward and away from the first disc, the first and second discs being axially aligned and offset by a distance that varies cyclically in correspondence with the translation of the second disc, increasing beyond an average distance during a first portion of each translation cycle and decreasing below the average distance during a second portion of each translation cycle; and
   a displacement mechanism to enable adjustment of the average distance by translating the first disc along the axis of rotation to a selected one of a plurality of different positions with respect to the frame.

11. The apparatus of claim 10 wherein, after translating the first disc to the selected one of the plurality of different positions with respect to the frame, the displacement mechanism maintains the first disc at the selected one of the plurality of different positions with respect to the frame while the second disc translates cyclically toward and away from the first disc.

12. The apparatus of claim 10 wherein the cyclical translation of the second disc with respect to the first disc constitutes a mechanical oscillation having a frequency and amplitude, and wherein changing a position of the first disc via the displacement mechanism from any one of the plurality of different positions to any other one of the plurality of different positions effects adjustment of the amplitude of the mechanical oscillation at a given frequency.

13. The apparatus of claim 10 wherein the second disc is mounted to the frame via one or more flexible members that enable the second disc to translate back and forth in an axial direction parallel to an axis of rotation of the first disc.

14. The apparatus of claim 13 wherein at least one of the one or more flexible members comprises a sheet of flexible, memoryless material that is fastened to the frame, deforms in response to translation of the second disc and applies an axially-directed spring force to the second disc when deformed.

15. The apparatus of claim 13 further comprising, in addition to the one or more flexible members, a mechanical travel limit to prevent the second disc from translating far enough to contact the first disc.

16. The apparatus of claim 10 wherein the cyclical translation of the second disc with respect to the first disc constitutes a mechanical oscillation having a frequency and amplitude, the apparatus further comprising a controller to control the amplitude of the mechanical oscillation at a given frequency by changing a position of the first disc via the displacement mechanism.

17. The apparatus of claim 10 further comprising a motor arrangement to rotate the first disc relative to the second disc at any one of a plurality of selectable rotation speeds.

18. The apparatus of claim 17 wherein the cyclical translation of the second disc with respect to the first disc constitutes a mechanical oscillation having a frequency and amplitude, the apparatus further comprising a controller to control at least the frequency of the mechanical oscillation by changing the rotation speed of the first disc relative to the second disc via the motor arrangement.

19. The apparatus of claim 17 further comprising an actuator shaft secured axially to the second disc such that the cyclically translation of the second disc produces a corresponding cyclical translation of the actuator shaft, and wherein the one or more flexible mounting members comprise at least two flexible mounting members fastened to the actuator shaft at respective points along its length.

20. The apparatus of claim 19 wherein each the at least two flexible members, when not deformed in response to translation of the second disc, extends to the frame in a direction substantially perpendicular to the actuator shaft.

21. The apparatus of claim 19 wherein each of the at least two flexible members applies an axially-directed spring force to the actuator shaft when deformed by translation of the second disc.

22. An apparatus for generating mechanical oscillation, the apparatus comprising:
   a frame;
   a first disc rotatably mounted to the frame and having permanent magnets disposed at its periphery in an alternating polar orientation; and
   a second disc disposed adjacent the first disc and having permanent magnets disposed at its periphery in an alternating polar orientation such that, as the first disc is rotated with respect to the second disc, the permanent magnets of the first and second discs move cyclically between attractive and repulsive positions with respect to one another to cause the second disc to translate cyclically with respect to the frame, toward and away from the first disc; and
   one or more flexible mounting members to secure the second disc to the frame while permitting cyclical translation of the second disc with respect to the frame, each of the one or more mounting members being formed by a respective sheet of flexible,
   memoryless material that is fastened to the frame and capable of deformation in response to the cyclical translation of the second disc with respect to the frame.

* * * * *